United States Patent [19]

Dawson

[11] 4,086,905
[45] May 2, 1978

[54] COMBINATION FIRE GRATE AND FIREPLACE COOKING APPARATUS

[76] Inventor: Robert E. Dawson, 2445 Edge Hill Rd., Huntingdon Valley, Pa. 19006

[21] Appl. No.: 647,193

[22] Filed: Jan. 7, 1976

[51] Int. Cl.² .......................... F47J 37/06; F24B 3/00; F24B 1/26; F23H 13/00
[52] U.S. Cl. ................................. 126/25 A; 126/137; 126/152 R; 126/164
[58] Field of Search .............. 126/137, 336, 164, 165, 126/25 A, 152 R

[56] References Cited

U.S. PATENT DOCUMENTS

| 494,462 | 3/1893 | Chullor | 126/164 |
| 618,766 | 1/1899 | Bagley | 126/336 |
| 742,210 | 10/1903 | Moreland | 126/336 |
| 909,756 | 1/1909 | Cherry | 126/164 |
| 1,118,501 | 11/1914 | Laughlin | 126/165 |
| 3,053,245 | 9/1962 | Beller | 126/25 A |
| 3,771,511 | 11/1973 | Dahlquist | 126/137 |

FOREIGN PATENT DOCUMENTS

| 10,163 of | 1915 | United Kingdom | 126/164 |

Primary Examiner—Paul E. Maslousky
Attorney, Agent, or Firm—Benasutti Associates, Ltd.

[57] ABSTRACT

A novel combination fire grate and fireplace cooking apparatus is described wherein a modular design facilitating the use of any of a variety of sizes of fossil fuels, e.g. coal, charcoal or wood, may be efficiently burned, while at the same time providing a heat source for cooking food placed on a cooking grill or grills which track along adjacent fireplace grate members. A novel compression assembly of modular fireplace grate members facilitates the use of the present invention in fireplaces of any width, as well as the easy disassembly and assembly of the unit for shipping or to adjust the unit to accept various sizes of fuels. A lightweight handle with a novel coupling configuration is provided for repositioning the cooking grill with respect to the fire, and/or for removing the cooking grill and food from the fire. This coupling means is designed to quickly and positively engage the cooking grill when inserted from a direction approximately perpendicular to the cooking surface. As the handle is then displaced arcuately towards the plane of the cooking surface, a novel hook-shaped tip portion and basal portion of the coupling means of the handle matably engage appropriately formed surfaces on the cooking grill because the secure inner connection of the handle and cooking grill. Further arcuate displacement of the handle then causes a tracking portion formed on the cooking grill to disengage from stops to thereby allow the cooking grill to be moved freely to any of a variety of cooking positions, or to be removed entirely for serving.

25 Claims, 25 Drawing Figures

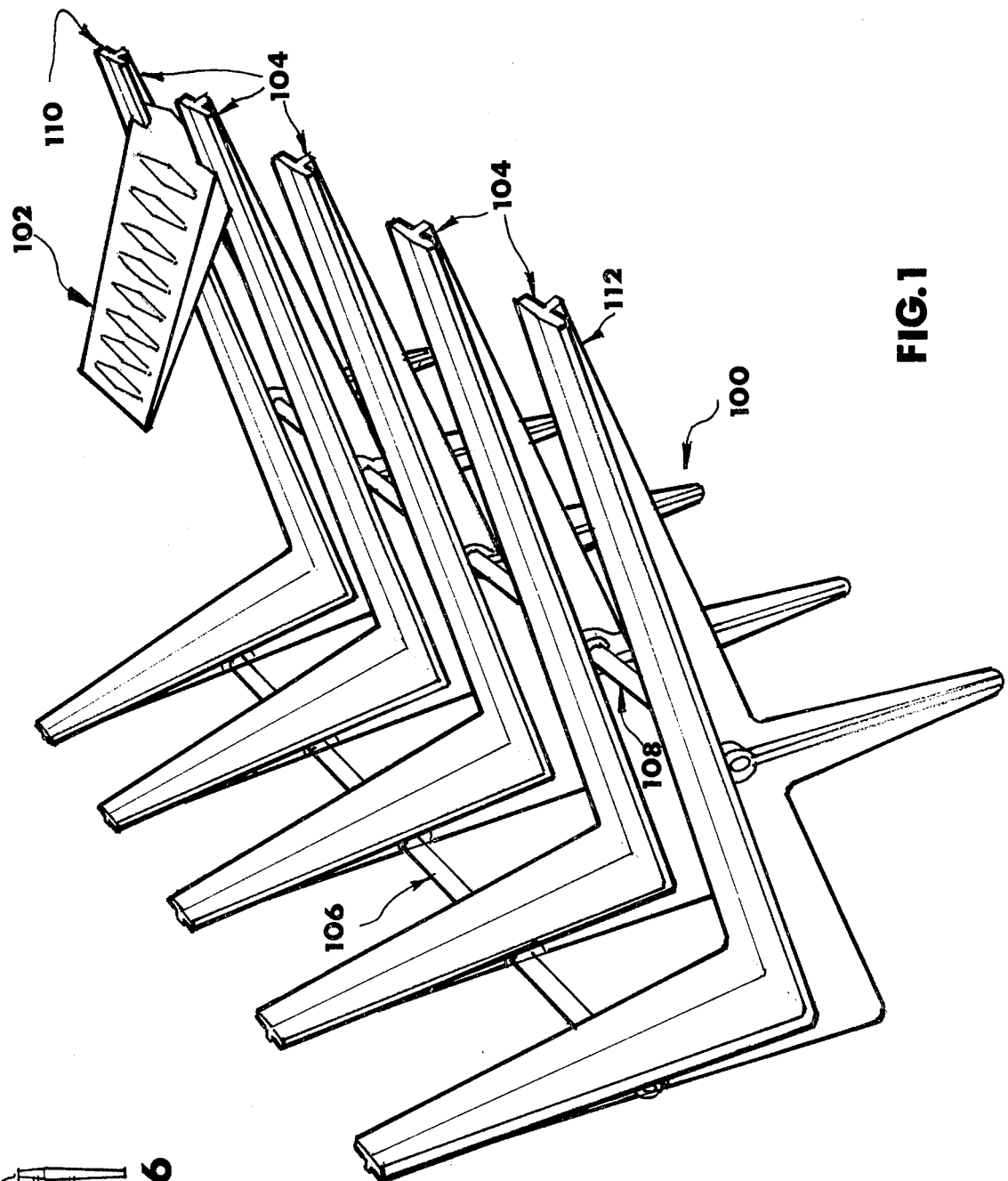
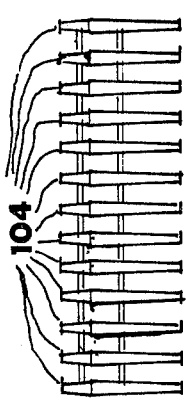
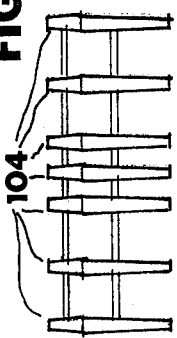
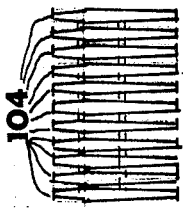
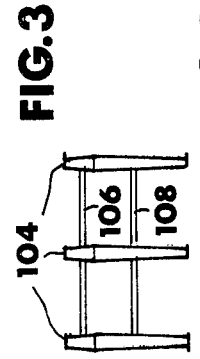

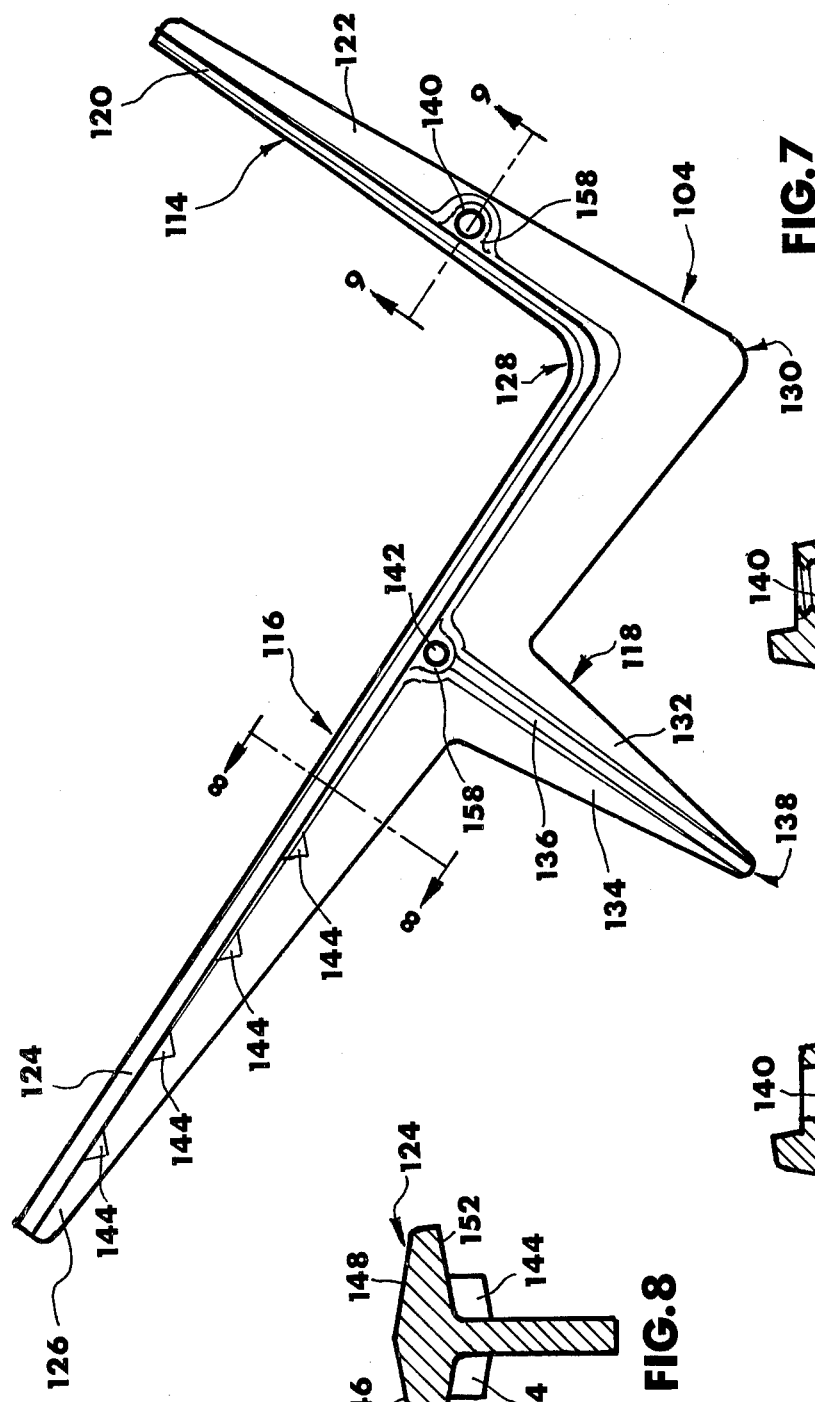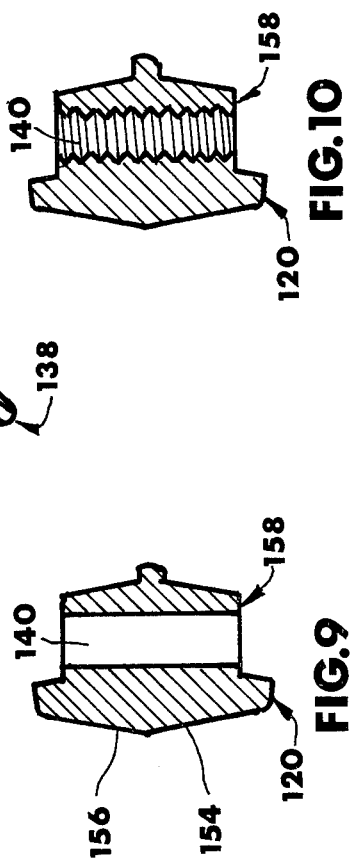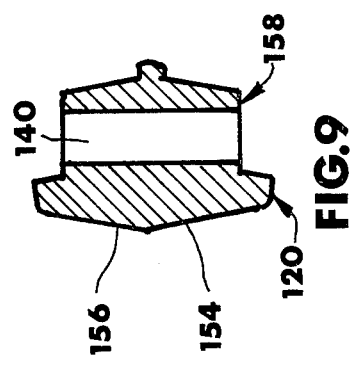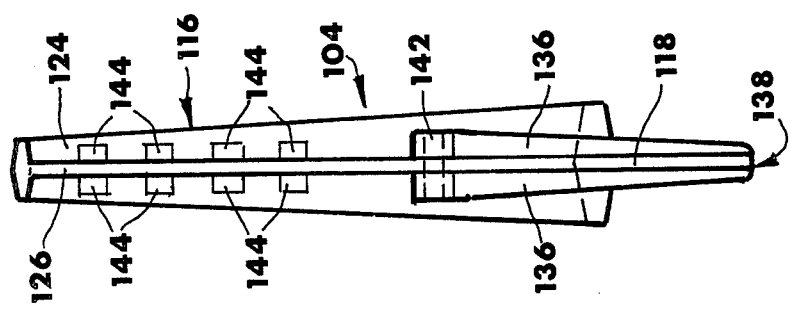

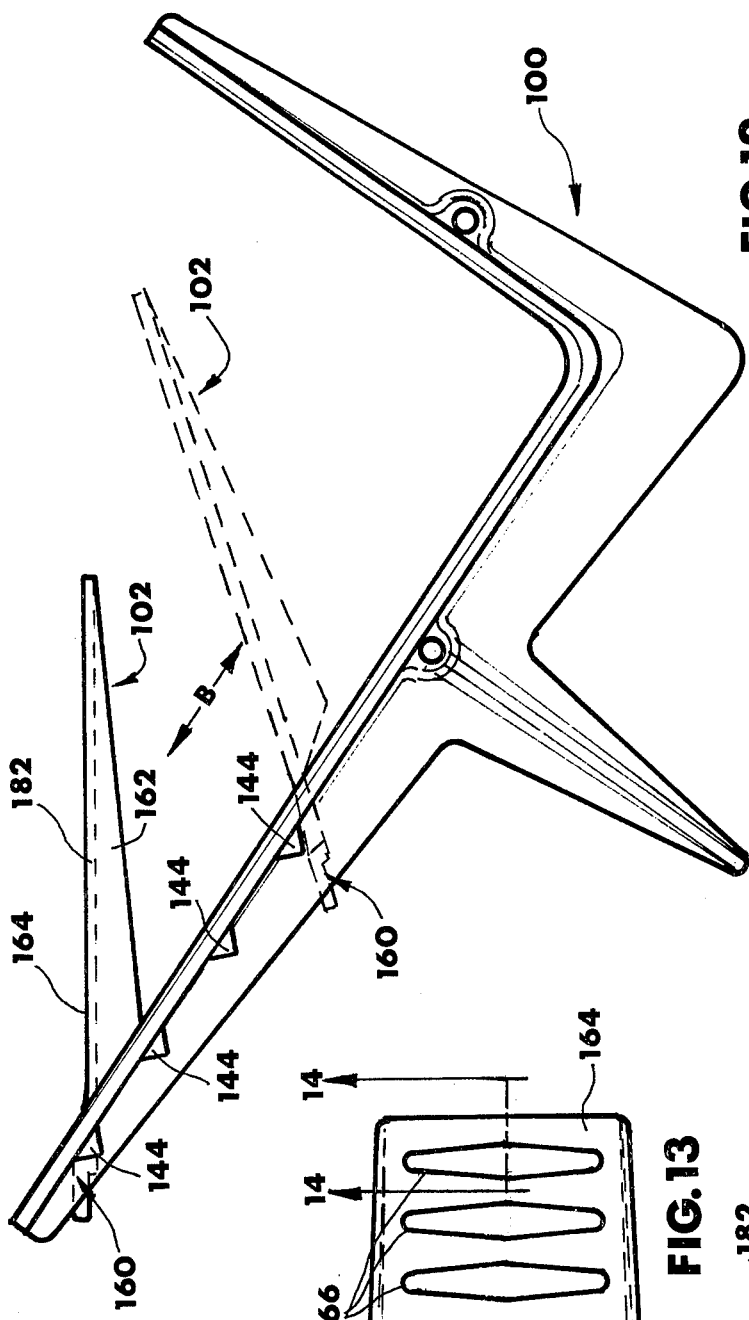
FIG.12
FIG.13
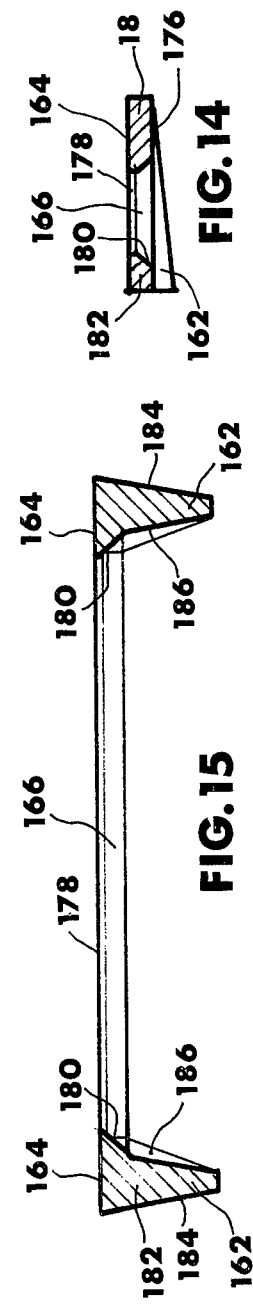
FIG.14
FIG.15
FIG.16

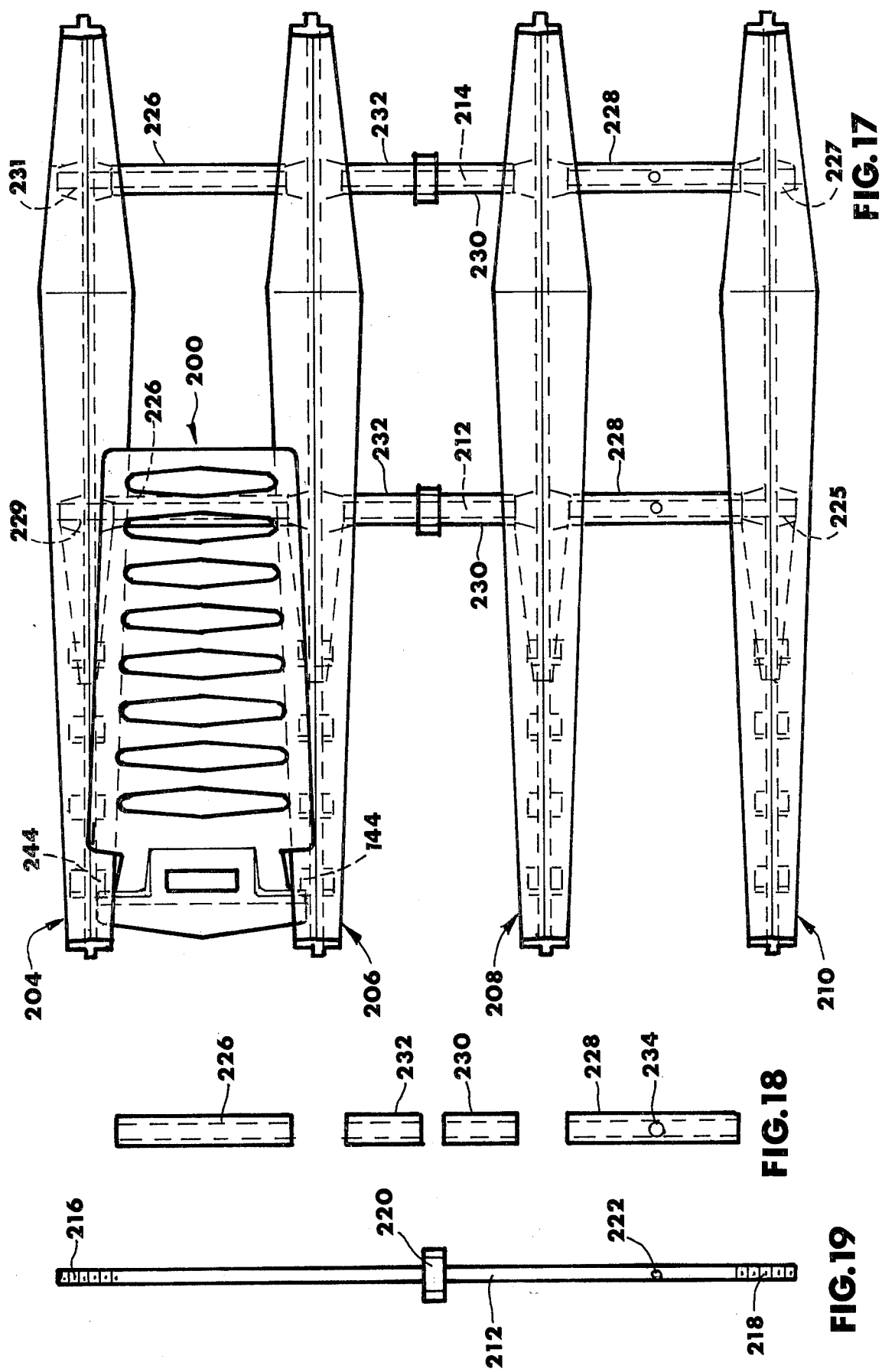

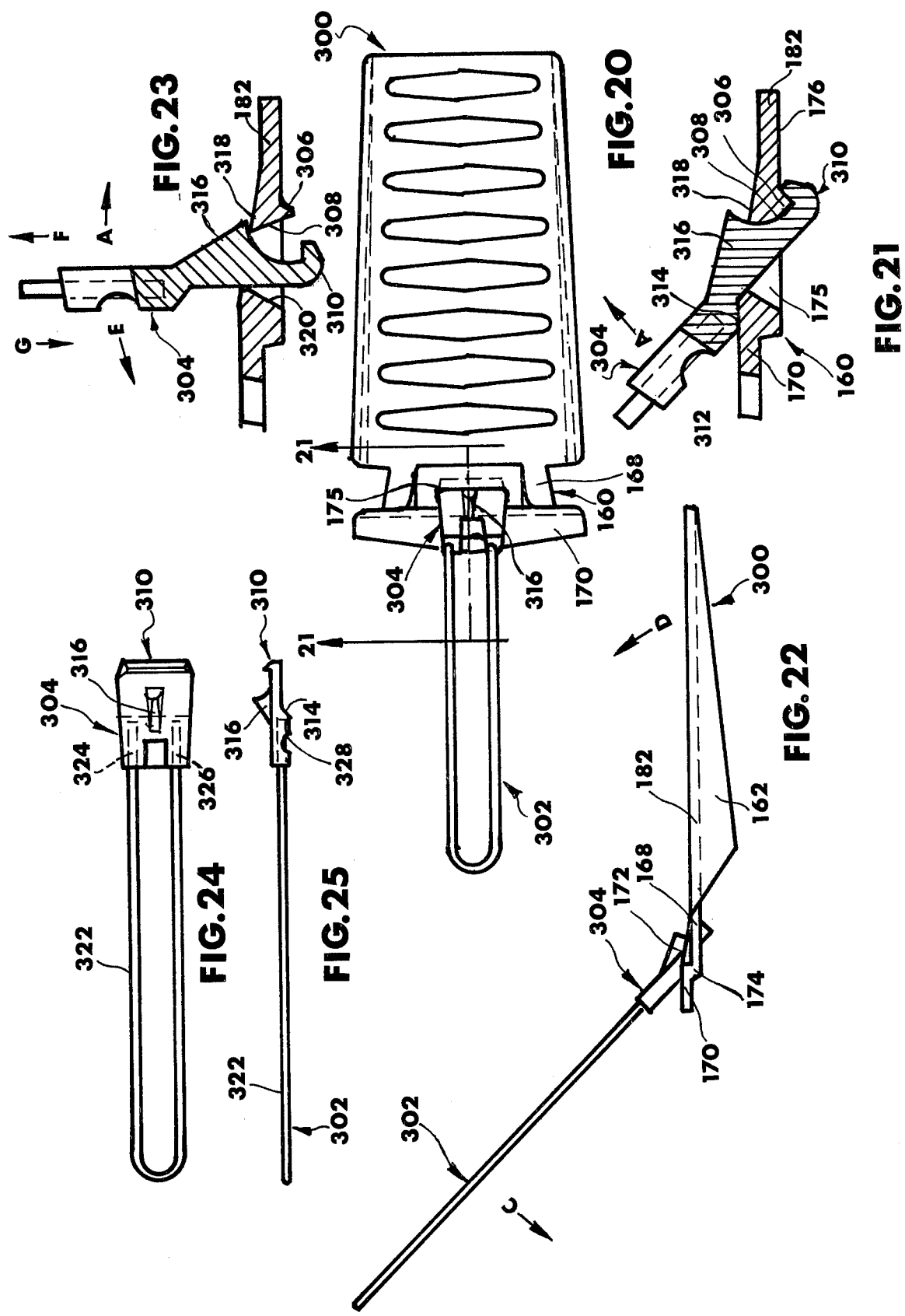

COMBINATION FIRE GRATE AND FIREPLACE COOKING APPARATUS

SUMMARY OF THE INVENTION

The present invention relates to cooking grills for use in fireplaces.

The present invention provides a novel modular fireplace grate comprised of a plurality of similarly shaped grate members which are intended to be shipped in an unassembled condition together with compression rods, which may be easily assembled in any of a variety of configurations which are spaced suitably for use with coal, charcoal or wood. This modular design permits individual fireplace assemblies of any length, depending upon the number and spacing of the grate members employed.

The particular configuration of the fireplace grate of the present invention is well adapted to the production of a cooking and/or heating fire in that the fuel feeding sections are disposed at an angle of approximately 35° with respect to the floor of the fireplace, thereby providing the self-feeding of the particular fossil fuel in use. Furthermore, this self-feeding feature opens the underside of the fireplace grate towards the room, thereby providing superior draft characteristics and an increased radiant output of heat into the room, not only from the coals which are exposed thereby, but also from the relatively flat radiant surfaces provided by the upstanding retainer sections of each of the grate members. Consequently, the fireplace grate of the present invention is an extremely efficient grate, notwithstanding its adaptability to other cooking purposes.

In addition to the basic modular grate assembly described above, the apparatus of the present invention further comprises a cooking grill, which is designed to slidably engage adjacent grate members along the fuel feeding sections of each of those grate members such that the cooking grill may be rigidly positioned in any of a variety of positions relatively closer or further away from the heat source. Simple removal and relocation of the grill is therefore made possible by tilting the grill at a slight angle, making it possible to remove the grill from the fire to turn over meat being cooked or to remove food from the grill. Since each grill unit extends approximately to the center line of the adjacent grate members, a plurality of grill units may be used simultaneously to create a single larger grill area. Even when grilling larger items, however, it will be noted that cleanup is greatly facilitated by the ability to break the grilling area into its component grill units for easy insertion into a dishpan or dishwasher.

Accordingly, a primary object of the present invention is the provision of a modular fireplace grate which may be easily assembled into any of a variety of configurations depending upon the type of fuel and size of fireplace opening to be used.

Another object of the present invention is the provision of a novel grill for use in combination with the modular fireplace grate assembly, which grill is adjustable along tracking means formed by adjacent grate members.

A further object of the present invention is the provision of a removable lift handle which forms a positive interlock with the cooking grill of the present invention for use in repositioning or removing said grills with respect to the fireplace grate of the present invention.

These and other objects of the present invention will become apparent from the following detailed description.

BRIEF DESCRIPTION OF THE DRAWINGS

FIG. 1 is a perspective view of the preferred embodiment of the fireplace grate of the present invention, showing a preferred embodiment grill unit engaged in a cooking position.

FIG. 2 is a top schematic view on a greatly reduced scale of a first alternate embodiment of the fireplace grate of the present invention, showing three grate members in a widely spaced configuration such as would be used for burning firewood in a relatively small fireplace.

FIG. 3 is a top schematic view of a second alternate embodiment of the fireplace grate of the present invention in which eight fireplace grate members have been assembled to fit a relatively larger fireplace in a configuration suitable for use with wood.

FIG. 4 is a top schematic view on a greatly reduced scale of a third alternate embodiment of the present invention comprising 11 fireplace grate members assembled into a configuration for a relatively smaller fireplace useful for burning coal or charcoal.

FIG. 5 is a top schematic view on a greatly reduced scale of a fourth alternate embodiment fireplace grate of the present invention similar to the embodiment shown in FIG. 3 wherein an alternate spacing of the fireplace grate members is employed, again to facilitate burning and cooking over wood.

FIG. 6 is a top schematic view on a greatly reduced scale of a fifth alternate embodiment of the fireplace grate of the present invention comprising thirteen fireplace grate members assembled in a configuration suitable for use in a relatively larger fireplace.

FIG. 7 is a end view of a single fireplace grate member as used in the assembly of the preferred and alternate embodiments shown in FIGS. 1-6.

FIG. 8 is a cross sectional view on a greatly enlarged scale of a portion of the fuel feeding section of the fireplace grate member shown in FIG. 7, taken along the lines and arrows 8—8 in FIG. 7.

FIG. 9 is a cross section of a portion of the upstanding retainer section of the fireplace grate member shown in FIG. 7, taken as indicated by the lines and arrows 9—9 in FIG. 7, said cross section being taken through a bore provided therein for the connecting rods of the present invention.

FIG. 10 is a cross section similar to that shown in FIG. 9, wherein said bore has been threaded to receive a threaded portion of said connecting rod.

FIG. 11 is a bottom view on a reduced scale of the fireplace grate member shown in FIG. 7.

FIG. 12 is an end view of the preferred embodiment shown in FIG. 1, wherein the cooking grill is shown slightly tilted for easy movement along the fuel feeding sections of its adjacent grate members.

FIG. 13 is a top view of the preferred cooking grill of the present invention showings its perforated cooking surface, tracking portion and handle coupling slot.

FIG. 14 is a cross section of a portion of the cooking grill shown in FIG. 13 taken as indicated by the lines and arrows 14—14 in FIG. 13.

FIG. 15 is a section on a greatly enlarged scale of a portion of the cooking grill shown in FIG. 13 taken along the lines and arrows 15—15 in FIG. 13.

FIG. 16 is a side view of the cooking grill shown in FIG. 13.

FIG. 17 is a top plan view on a somewhat reduced scale of a sixth alternate embodiment.

FIG. 18 is a top plan view of the spacers used in the assembly of the embodiment shown in FIG. 17.

FIG. 19 is a top plan view of the connecting rods used in the assembly of the embodiment shown in FIG. 17.

FIG. 20 is a top view on a somewhat reduced scale of a cooking grill of the present invention which is engaged by the preferred embodiment lift handle of the present invention.

FIG. 21 is a cross section on a greatly enlarged scale of a portion of the lift handle and cooking grill shown in FIG. 20, taken as indicated by the lines and arrows 21—21 in FIG. 20.

FIG. 22 is a side view of the lift handle and cooking grill shown in FIG. 20.

FIG. 23 is a greatly enlarged cross section similar to the view shown in FIG. 21, wherein the lift handle has been arcuately displaced, as shown by arrow A, to disengage said lift handle from said cooking grill.

FIG. 24 is a top plan view of a preferred embodiment lift handle of the present invention.

FIG. 25 is a side view of the lift handle shown in FIG. 24.

DETAILED DESCRIPTION OF THE DRAWINGS

Referring now to FIG. 1 of the present invention, the basic configuration of the preferred embodiment fireplace grate designated generally 100 and cooking grill designated generally 102. The fireplace grate of the present invention is comprised generally of a plurality of grate members designated generally 104. In the preferred embodiment shown in FIG. 1, five grate members 104 are rigidly interconnected by connecting rods designated generally 106 and 108, which pierce each of the grate members in two different places to axially align these grate members 104 with respect to each other. Surrounding each of the connecting rods 106 and 108, but not clearly visible in FIG. 1, are spacers which act to space each of these grate members 104 at preselected parallel positions with respect to each other. The outermost grate members designated generally 110 and 112 are compressed towards each other by the action of the connecting rods 106 and 108, thereby facilitating the rigid interconnection and alignment of the fireplace grate of the present invention.

Referring now to FIGS. 2–6, various alternate embodiments of the fireplace grate on the present invention are shown in top schematic views on a greatly reduced scale. It is anticipated that due to the variety of fireplace fuels currently available for use in the home a variety of spacings of grill members is desirable in the various alternate embodiments so that coal, charcoal and wood can easily be accommodated by the fireplace grate. In FIG. 2, three fireplace grate members are shown relatively widely spaced apart and interconnected by connecting rods 106 and 108, which configuration is intended to be used in a small wood burning fireplace. Referring to FIG. 3, a wood unit for a relatively larger fireplace is shown, wherein eight grate members 104 are shown rigidly interconnected by connecting rods 106 and 108. Five of these grate members 104 are relatively closely spaced together with respect to the remaining three, such that wood may be employed in building fires on this grate. Referring to FIG. 4, 11 grate members 104 are similarly interconnected to form an assembly intended for use in a relatively smaller fireplace with coal or charcoal. It will be noted that in this configuration the flat surfaces of the grate members 104 provides a relatively continuous surface from which heat will be radiated into the room in which the fireplace is located. This is particularly advantageous since, in many cases, coal fires are used as supplemental forms of space heating.

Referring now to FIG. 5, a fourth alternate embodiment of the fireplace grate of the present invention similar to the size illustrated in FIG. 3 is shown, wherein a symmetrical arrangement of grate members 104 has produced an embodiment suitable for use with wood. Referring to FIG. 6, a fifth alternate embodiment fireplace grate is illustrated which is adapted for use in a relatively larger fireplace for use with wood. As illustrated in FIGS. 2–6, an endless variety of sizes and configurations of fireplace grate units may be constructed, each of which basically comprises a plurality of grate members 104 and at least two connecting rods 106 and 108.

FIG. 7 illustrates a single fireplace grate member designated generally 104. This grate member comprises an upstanding retainer section designated generally 114, a fuel feeding section designated generally 116, and a supporting section designated generally 118. The upstanding retainer section 114 and fuel feeding section 116 are each of generally T-shaped cross section, whereas the supporting section designated generally 118 is of substantially X-shaped cross section to provide additional rigidity to the unit. The upstanding retainer section 114 has a retainer face and retainer flange 122 transversely disposed with respect to said retainer face 120 to provide rigidity to this section. Similarly, the fuel feeding section designated generally 116 comprises a fuel feeding face 124 and fuel feeding flange 126, which provide rigidity to the fuel feeding section 116. The axis of the upstanding retainer section 114 and fuel feeding section 116 are substantially transverse to each other. Retainer face 120 and fuel feeding face 124 intersect in a gently rounded portion to form a fire notch designated generally 128, extending axially in a direction perpendicular to the axes of the retainer and fuel feeding sections. Similarly, the retainer flange 122 and fuel feeding flange 126 intersect to form a slightly rounded footing designated generally 130. The supporting section designated generally 118 intersects and extends away from the fuel feeding section along an axis which is substantially parallel to the axis of the upstanding retainer section designated generally 114. The supporting section 118 comprises two supporting flanges 132 and 134, and two transverse flanges, of which only transverse flange 136 is visible in FIG. 7. The supporting flanges 132 and 134 and transverse flanges 136 of the supporting section designated generally 118 form a support means having a substantially X-shaped cross section. It should be noted that supporting flanges 132, 134, transverse flanges 136, fuel feeding flange 126, and retainer flange 122 all taper gently towards the ends of their respective sections. Supporting flange 118 is selected to be of a length and is positioned with respect to the axis of the fuel feeding section designated generally 116 so that the fuel feeding face 124 of the fuel feeding section 116 is disposed at an angle of approximately 35° with respect to the axis intersecting the footing 130 and the supporting tip designated generally 138 of the supporting section designated generally 118. This configuration of the grate member 104 provides for a gentle feeding action of the fuel to be burned, since wood or other fuel introduced onto the grate from the left as viewed in FIG. 7 will gently be urged by gravity towards the fire notch 128, which is located generally towards the rear of the fireplace. Furthermore, the location of the fuel feeding section designated generally 116, at this angle allows for the introduction of a good draft into the combustion zone.

As seen in FIG. 7, two bores are provided along transverse axes, which bores are intended to engage and be pierced by the connecting rods used in the assembly of the fire grate. Retainer connecting bore 140 and nexis connecting rod bore 142 are each symmetrically disposed with respect to the mass of the upstanding retainer section designated generally 114, with respect to the retainer connecting rod bore 140, and with respect to the mass of fuel feeding section 116 and supporting section 118 for nexis connecting rod bore 142. Triangular stops 144 are disposed at preselected positions adjacent to intersections between fuel feeding flange and fuel feeding face 126 and 124 respectively, the function of which stops 144 will be more fully described hereinafter.

Referring now to FIG. 11, which is a bottom view on a somewhat reduced scale of the grate member 104 shown in FIG. 7, the undersides of the supporting section designated generally 118 and fuel feeding section 116 are clearly shown. Each fuel feeding section 116 comprises two track means which extend longitudinally along each half of the fuel feeding section designated generally 116 and comprise the contiguous surfaces of the fuel feeding face 124, the fuel feeding flange 126, and triangular stops 144. Two sets of triangular stops are seen disposed in axial alignment on either side of the fuel feeding flange 126 so that a plurality of cooking grills may be aligned with respect to each other on adjacent tracks. This track means allows axial movement of the cooking grill along the fuel feeding section designated generally 116, as will be described more fully hereinafter.

Referring now to FIG. 8, which is a cross section taken as indicated by the lines and arrows 8—8 on FIG. 7, the cross sectional configuration of a portion of the fuel feeding section is clearly illustrated. The fuel feeding face 124 in FIG. 8 is seen to comprise slightly beveled face surfaces 146 and 148, and similarly beveled undersurfaces 150 and 152.

Similar cross sectional views are shown in FIGS. 9 and 10, wherein the upstanding retainer section 114 is seen to have a retainer face designated generally 120, having beveled retainer face surfaces 154 and 156. A bore boss 158 is seen disposed adjacent to the retainer face 120, having drilled therethrough the retainer connecting rod bore 140. In the case of the embodiment shown in FIG. 10, this bore has been threaded for use with a threaded connector rod.

Referring now to FIG. 12, which is an end view of the embodiment of the present invention shown in FIG. 1, the position and inter-engagement of the cooking grill designated generally 102 is shown in a first cooking position and a second phantom tracking or sliding position. As shown in phantom, when the cooking grill 102 is slightly displaced or tilted up away from the fire, the tracking portion 160 of the cooking grill disengages from triangular stop 144, thereby allowing the cooking grill 102 to be moved axially as indicated by double ended arrow B. As shown in solid lines in FIG. 12, in the cooking position the cooking grill 102 is locked into position by means of the mating engagement between tracking portion 160 of the cooking grill 102 against the substantially vertical surface of triangular stop 144, and the engagement of cooking grill flange 162 which reinforces the cooking surface 164 and is beveled along its edge closest to the tracking portion at an angle of approximately 35° with respect to the plane of the cooking surface. Consequently, in the cooking position the cooking grill 102 is substantially horizontal when the grate is placed on a substantially horizontal face.

Referring to FIG. 13, which is a top view of the cooking grill 102, the cooking grill is seen to comprise a cooking surface 164 which has defined therein a plurality of transverse spaced apart openings 166. The tracking portion designated generally 160 of the cooking grill is seen to comprise extension portions 168 disposed within the plane of the cooking surface, a raised portion 170 and a beveled portion 172. Defined within the beveled portion is a slot 175 for engagement with the lift handle of the present invention, as will be explained in more detail hereinafter. An offsetting portion 174 is provided between extension portions 168 and raised portion 170 to space the raised portion 170 apart from the cooking surface 164, so that the raised portion 170 will act as a raised lever surface.

Referring to FIG. 14, the cross sectional configuration of a portion of the cooking grill 102 in FIG. 13 is shown, indicating that the transverse spaced apart openings 166 defined within the cooking surface 164 are beveled in an undercut fashion, that is, in a bevel which increases the area of the opening towards the cooking grill undersurface 176. This undercut configuration allows juices and pieces of food which may dislodge during cooking to drop through to the fire rather than to accumulate on the cooking grill itself. A substantially perpendicular lip 178 is disposed around the edge of the spaced apart opening 166, which is contiguous to the cooking surface 164 so that the intersection between the cooking surface 164 and perpendicular lip 178 is not sharp or easily nicked. Cooking grill flange 162 is seen to extend to the very tip of the cooking grill undersurface to provide vertical support to that surface.

Referring to FIG. 15, which is a longitudinal section of the cooking grill of the present invention taken as indicated by the lines and arrows 15—15 in FIG. 13, it will be seen that the cooking grill flanges 162 are tapered away from cooking grill surface 162. A transverse spaced apart opening 166 is shown in cross section, which reveals that perpendicular lip 178 and the undercut bevel 180 are uniform around the circumference of the transverse spaced apart opening. As seen in FIG. 15, the cooking grill flange 162 and cooking grill surface member (having an upper cooking surface 164 and lower cooking grill undersurface 176) intersect to form coplanar sides 184, which taper slightly towards the tip of the cooking grill, which taper is indicated by interior cooking grill flange surfaces 186 shown in FIG. 15.

As seen in the figures, the cooking grill of the present invention is extremely versatile, and particularly well adapted for cooking over a fireplace fire. The unit is attractive sturdy, and provides a minimum of angles or crevises in which food could become lodged during cooking. Instead of providing one large, hard to handle and hard to clean grill, the present invention provides that a plurality of cooking grills may be used in order to grill larger objects, such as steaks, pork chops, with easy cleanup being facilitated by the relatively smaller size of each individual cooking grill unit.

Referring to FIG. 17, a top view of an assembled fireplace grate of the present invention is shown wherein a single cooking grill designated generally 200 is shown in engagement with grate members designated generally 204 and 206 respectively. FIG. 17 illustrates the assembly of grate members designated generally 204, 206, 208 and 210 by means of transverse compression rods 212 and 214. One of these compression rods 212 is shown in FIG. 19, having threaded ends 216 and 218, which threads are formed in reverse directions, i.e. one of these threads is a righthand and the other a lefthand thread. A nut 220 is disposed between threaded ends 216 and 218, and is welded to or otherwise rigidly affixed to compression rod 212 for the purpose of facilitating the rotation of the rod during assembly of the fireplace grate of the present invention. Alternatively, a tightening bore also shown on compression rod 212 for the purposes of illustration, may be provided for the purpose of producing the desired rotation of the compression rod for rotating the rod around its axis and for threading the rod into threaded bores formed in the grate members. As seen in FIG. 17, grate members designated generally 204 and 210 have defined therein threaded retainer connecting rod bores 231 and 227, and nexis threaded connecting rod bores 229 and 225. In addition to connecting or compression rods 212 and 214, which serve as a compression means piercing each of the grate members along an axis substantially perpendicular to the plane of the grate members for aligning the grate members axially with respect to each other and for forcing end grate members 204 and 210 towards each other along the axis of said axial alignment. Spacing means are provided disposed between said grate members around said compression means for retaining the grate members at a preselected parallel spaced apart position with respect to each other, and for transferring the compressive force applied by the compression means from grate members 204 and 210 to the remainder of the grate members, to thereby rigidly interconnect the grate members in an axially aligned position. This spacing means is shown in FIG. 18 and comprises a plurality of tubular spacers 226, 228, 230 and 232. As with the remainder of the fireplace grate assembly of the present invention, these spacers may be constructed from any suitable fireplace grate material, such as cast iron, steel, zinc, titanium, or any other material capable of resisting the temperatures normally encountered in a fireplace while providing the strength required for such a unit. During the assembly of the fireplace grate as shown in FIG. 17, the spacers and grate members are appropriately threaded on compression or connecting rods 212 and 214 until the unit is loosely assembled. Since the unthreaded connecting rod bores defined in grate members 206 and 208 as shown in FIG. 17 are of a larger diameter than that of the connecting or compression rods 212 and 214, there is some play of the grate members 206 and 208 with respect to the end grate members 204 and 210. After loose assembly is completed, the entire unit may be placed on the floor of the fireplace, and regardless of the number of grate members used for the particular assembly, each of the grate members will conform to any irregularities in the floor of the fireplace firebox. Once in position, final assembly of the fireplace grate will be effected by tightening of nut 220 or by inserting a pin through hole 234 in spacer 228 to pierce tightening bore 222, and then rotating that pin to cause tightening of the entire assembly. Since spacers 228, 230, 232 and 226 engage the bore boxes defined in each of the grate members, a very rigid final structure will be produced which is axially aligned with respect to each other, and which also compensates for minor irregularities in the floor on which the unit is placed.

Once in position, the cooking grill of the present invention may be easily slid onto the unit as previously described, which operation is preferably performed using the novel handle means of the present invention. This handle means and its coupling with the cooking grill of the present invention is clearly illustrated in FIGS. 20–25 of the drawings. FIG. 20 is a top view showing a cooking grill designated generally 300, into which has been coupled a lift handle designated generally 302, which is in accordance with the preferred embodiment of the present invention. This lift handle comprises a coupling portion designated generally 304, which selectively pierces slots 175, defined in the tracking portion designated generally 106 of the cooking grill 300. As seen in FIGS. 20, 21 and 22, the lift handle of the present invention is in firm engagement with the cooking grill and is capable of producing an arcuate movement of the cooking grill as indicated by the arrow D in FIG. 22, which movement is produced by moving the lift handle designated generally 302 of the present invention in an arcuate direction as indicated by arrow C in FIG. 22. This arcuate movement causes disengagement of the tracking portion designated generally 160 from the multiposition stop means, thereby allowing the cooking grill to be moved along the track means freely with respect to its adjacent fuel feeding sections. In the coupled position, the engagement between the lift handle designated generally 302 and the cooking grill designated generally 300 is additionally secure enough to allow the lifting of food having a substantial weight which may be disposed on the cooking surface of the cooking grill.

Referring now more specifically to the enlarged cross section of FIG. 21, which is taken as indicated by the lines and arrows 21—21 of FIG. 20, the coupling portion designated generally 304 is shown in its engaged position with the cooking grill. The details of the tracking portion 160 are clearly shown in the vicinity of slot 175 defined in the tracking portion. Cooking grill undersurface 176 and one of the interior surfaces of slot 175 intersect in a boss 306. The coupling portion designated generally 304 of the handle means comprises a hook-shaped tip portion designated generally 310 for matably engaging interior surface 308 of slot 175, boss 306, and at least a portion of the undersurface 176 of tracking portion 160. The tracking portion designated generally 160 further comprises a raised lever surface which is the upper surface of the raised portion 170, which raised lever surface 312 is substantially parallel to the cooking surface and which is designed to be matably engaged, at least in part, by a basal surface 314 when the coupling portion designated generally 304 is in the engaged position shown in FIG. 21. A releasing member 316 is provided which forms a continuous arcuate surface with that portion of the hook-shaped tip portion 310 which matably engages interior surface 308, boss 306 and a portion of the undersurface 176, which releasing member slidably engages a raised bevel portion of the cooking grill surface member 182 at its intersection with interior surface 308. As seen clearly in FIG. 23, arcuate displacement of the lift handle along the direction as indicated by arrow A in FIGS. 21 and 23 produces the tracking of releasing member 316 against the edge formed by raised bevel portion 318 and interior surface 308. The purpose for the raised bevel portion 318 is to tend to lift the handle upwardly as shown in FIG. 23 to minimize the likelihood that the hook-shaped tip portion designated generally 310 could become fouled on the handle when it is removed along the direction as indicated by arrow F in FIG. 23. The bevel imparted to interior surfaces 308 and 320 further act to channel the hook-shaped tip portion 310 to provide for easy release of the coupling portion 304. Also, as seen in FIG. 23, arcuate displacement of a handle which has been inserted in a direction as shown by arrow G in FIG. 23, which arcuate displacement is towards the plane of the cooking surface as indicated by arrow E in FIG. 23, produces the engagement in the coupled position as shown in FIGS. 20, 21 and 23, and as discussed hereinabove.

FIGS. 24 and 25 show the construction of the lift handle which is seen to comprise wire member 322 which pierces the coupling portion 304 laterally with respect to releasing member 316. Bores 324 and 326 accept the tips of wire 322 and arcuate cutouts 328 which open the bores to the undersurface of the coupling portion 304, allow the wire to be peened to hold it in place. The resultant handle is extremely lightweight, sturdy, and effects a very stable engagement of the cooking grill.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A self-stoking fireplace cooking apparatus for use with any of a variety of sizes of solid fossil fuels comprising:
   (a) a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section;
   (b) compression means piercing each of said grate members along an axis substantially perpendicular to the plane of said grate members for aligning said grate members axially with respect to each other and for forcing at least two of said grate members towards each other along the axis of said axial alignment;
   (c) spacing means disposed between said grate members around said compression means for retaining said grate members at a preselected parallel spaced apart position with respect to each other, and for transferring said compressive force applied by said compression means from said two of said grate members to the remainder of said grate members to thereby rigidly interconnect said grate members in said axially aligned position; and
   (d) a cooking grill having a substantially planar cooking surface disposed thereon, and wherein said fuel feeding sections further comprise track means for allowing axial movement of said cooking grill, said cooking grill being capable of slidably engaging said track means for movement substantially along the axis of said fuel feeding section.

2. The invention of claim 1 wherein said fuel feeding section further comprises multi-positioned stop means disposed along said track means for retaining said cooking grill at any of a variety of preselected positions along the axis of said fuel feeding section.

3. The invention of claim 2 wherein said cooking grill further comprises a tracking portion for slidably engaging said track means of adjacent fuel feeding sections and for selectively engaging said multi-position stop means, and wherein said cooking grill further comprises flange means disposed substantially transverse to said cooking surface for supporting said cooking surface and for retaining said cooking surface in a substantially horizontal position under load when said tracking portion is in engagement with said multi-position stop means.

4. The invention of claim 3 wherein said apparatus further comprises handle means for removably engaging said cooking grill and for causing, upon arcuate displacement of said handle means, a selective disengagement of said tracking portion from said multi-position stop means, and further for selectively supporting said cooking surface under load in said disengaged position.

5. The invention of claim 4 wherein said tracking portion has a slot defined therein, and wherein said handle means comprises a coupling portion, at least a portion of which coupling portion selectively pierces said slot defined in said tracking portion of said cooking grill.

6. The invention of claim 5 wherein an undersurface portion of said tracking portion is in parallel spaced apart relation to said cooking surface, and further wherein a boss is disposed along one of the edges of said slot defined in said tracking portion at its intersection with said undersurface, and wherein said coupling portion of said handle means further comprises at least one hook-shaped tip portion for matably engaging the interior surface of said slot adjacent said boss, and at least a portion of the undersurface of said tracking portion.

7. The invention of claim 6 wherein said tracking portion further comprises a raised lever surface disposed substantially parallel to said cooking surface away from said undersurface, and wherein said coupling portion further comprises a basal surface for matably engaging at least a portion of said raised lever surface when said handle is in engagement with said cooking grill.

8. The invention of claim 4 wherein said handle means further comprises coupling means for piercing said tracking portion and for rigidly engaging said cooking grill when said handle means is pivoted towards the plane of said cooking surface, and for releasing itself when said handle means is pivoted towards an axis which is perpendicular with respect to said cooking surface.

9. The invention of claim 8 wherein continued arcuate displacement of said handle means towards the plane of said cooking surface further causes the disengagement of said tracking portion from said multi-position stop means, thereby allowing said cooking grill to be moved along said track means freely with respect to said fuel feeding section.

10. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions with respect to each other; said means disposed through said grate members comprising at least one rod having threaded tips with reverse threads for engaging threaded bores with complemental threads disposed within at least two of said grate members, said rods further comprising rotational means for rotating said rods around their axis and for threading said rods into said threaded bores formed in said grate members, said rotational means comprising at least one bore defined through each of said rods.

11. A fireplace grate for use on the floor of a fireplace comprising:
  (a) a plurality of distinct grate members;
  (b) compression means piercing each of said grate members for selectively forcing at least two of said grate members towards each other; and
  (c) spacing means disposed between said grate members for transferring forces applied by said compression means to at least one additional grate member disposed between said two of said grate members and for retaining said grate members at preselected spaced apart positions with respect to each other; and
  (d) means for allowing at least said one of said grate members to conform to the surface of said floor, said means comprising a bore defined in at least said one of said grate members, said compression means being disposed through said bore and said bore being larger than the diameter of said compression means, whereby said one of said grate members is allowed to move to conform to said floor during the assembly of said cooking apparatus.

12. A fireplace cooking apparatus for use on a floor of a fireplace, comprising: a plurality of distinct spaced apart grate members, each of which comprises at least one sloping fuel feeding section, and a cooking grill comprising a substantially planar cooking surface portion extending away from a tracking portion of said cooking grill, at least two of said fuel feeding sections further comprising track means disposed between portions of said tracking portion for allowing axial movement of said cooking grill with respect thereto, said cooking grill slidably engaging said track means for movement therealong.

13. The invention of claim 12 wherein at least a portion of said cooking grill is disposed between adjacent ones of said fuel feeding sections.

14. A fireplace cooking apparatus for use on a floor of a fireplace, comprising: a plurality of distinct spaced apart grate members and a cooking grill having a substantially planar cooking surface thereon, at least two of said grate members further comprising track means for allowing axial movement of said cooking grill with respect thereto, said cooking grill slidably engaging said track means for movement therealong, said track means further comprising multi-positioned stop means for retaining said cooking grill at any of a variety of preselected positions therealong.

15. The invention of claim 14 wherein said apparatus further comprises handle means for removably engaging said cooking grill for at least selectively causing said rotation of said grill.

16. A fireplace cooking apparatus for use on a floor of a fireplace, comprising: a plurality of distinct spaced apart grate members and a cooking grill having a substantially planar cooking surface thereon, at least two of said grate members further comprising track means for allowing axial movement of said cooking grill with respect thereto, said cooking grill slidably engaging said track means for movement therealong, said cooking grill having a slot defined therein, and wherein said apparatus further comprises handle means having a coupling portion, at least a portion of which coupling portion selectively pierces said slot defined in said cooking grill to engage said cooking grill upon arcuate displacement of said handle means.

17. A method of assembling and installing a fireplace grate assembly into the floor of a fireplace comprises the steps of:
  (a) providing at least three grate members, each of said grate members having at least one bore defined therethrough;
  (d) providing at least one compression rod having a length substantially equal to the desired length of the assembled fireplace grate and a diameter less than the bore in at least one of said grate members;
  (c) providing a plurality of tubular spacing means having lengths preselected according to the desired spacing of said grate members;
  (d) assembling said fireplace grate unit by introducing said compression rod through each of said bores in said grate members with said spacing tubes disposed around said rod between said grate members;
  (e) placing said assembled fireplace grate on the floor of the fireplace;
  (f) allowing said grate to conform to the floor of said fireplace; and
  (g) tightening said compression rod with respect to the endmost grate members to compress the remaining grate members and spacing tubes therebetween.

18. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions with respect to each other, said fuel feeding section tapering outwardly towards an intersection with said fuel feeding section.

19. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions with respect to each other, said retainer section tapering outwardly towards an intersection with said supporting section.

20. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions with respect to each other, said supporting section having a generally "X"-shaped cross-section.

21. The invention of claim 20 wherein said means disposed through said grate members comprises at least one rod disposed at the intersection of said supporting section with said fuel feeding section.

22. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions with respect to each other, said fuel feeding and said retainer sections having generally "T"-shaped cross sections.

23. The invention of claim 22 wherein said apparatus is supported by said floor at the intersection between said fuel feeding and said retainer sections.

24. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parllel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions to each other; said means disposed through said grate members comprising at least one rod having threaded tips with reverse threads for engaging threaded bores with complemental threads disposed within at least two of said grate members, said rods further comprising rotational means for rotating said rods around their axis and for threading said rods into said threaded bores formed in said grate members, said rotational means comprising at least one nut formed on the exterior surface of each of said rods.

25. A self-stoking fireplace apparatus for placement on the floor of a fireplace and for use with any of a variety of sizes of solid fossil fuels comprising: a plurality of distinct grate members, each of which members comprises an upstanding retainer section, a fuel feeding section transversely disposed with respect to said upstanding retainer section, and a supporting section attached to said fuel feeding section along an axis substantially parallel to the axis of said upstanding retainer section; and compression means disposed through said grate members along an axis substantially perpendicular to the plane of said grate members for aligning said grate members axially with respect to each other; and spacing means for retaining said grate members at preselected parallel spaced apart positions with respect to each other, said supporting section tapering outwardly towards an intersection with said fuel feeding section.

* * * * *